(12) United States Patent
Misawa

(10) Patent No.: US 7,606,482 B2
(45) Date of Patent: Oct. 20, 2009

(54) IMAGE CAPTURING APPARATUS HAVING A SMALL REMOVABLE MEMORY AND A SMALL DISPLAY, IMAGE CAPTURING METHOD AND IMAGE STORING APPARATUS THEREOF

(75) Inventor: Atsushi Misawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 521 days.

(21) Appl. No.: 11/434,918

(22) Filed: May 17, 2006

(65) Prior Publication Data
US 2006/0263078 A1 Nov. 23, 2006

(30) Foreign Application Priority Data
May 17, 2005 (JP) ............................. 2005-143367

(51) Int. Cl.
G03B 17/18 (2006.01)
H04N 5/232 (2006.01)
(52) U.S. Cl. ...................... 396/287; 396/56; 348/211.8; 348/211.14; 348/231.2; 348/333.01
(58) Field of Classification Search ....................... None
See application file for complete search history.

(56) References Cited
U.S. PATENT DOCUMENTS 5,606,420 A * 2/1997 Maeda et al. ............... 358/296
6,704,047 B1 * 3/2004 Tsutsui .................... 348/231.7
6,816,190 B1 * 11/2004 Miyazawa ................ 348/231.6
2006/0022895 A1 * 2/2006 Williams et al. ............. 345/2.1
2007/0147774 A1 * 6/2007 Mori et al. .................... 386/83

FOREIGN PATENT DOCUMENTS
JP 11-266381 A 9/1999

* cited by examiner

Primary Examiner—Jay M Patidar
(74) Attorney, Agent, or Firm—Sughrue Mion, PLLC

(57) ABSTRACT

There is provided an image capturing apparatus that enables a user to confirm images already captured by the user on the image capturing apparatus even when the captured images have been transferred to another storage unit other than the image capturing apparatus and that enables the user to display the desirable captured images on an external display unit by remotely controlling the image capturing apparatus connected with the external display unit. The image capturing apparatus has an image capturing section for capturing images, a large memory for storing the captured images, a small memory whose memory capacity is smaller than that of the large memory and which is removable from the image capturing section, an image compressing section for compressing the captured images, a storage processing section for storing the compressed images in the small memory, a small display section having a less number of pixels than the captured images and a display control section for reading the compressed images out of the small memory to display on the small display section.

15 Claims, 8 Drawing Sheets

| IMAGE IDENTIFIER | IMAGE CAPTURING TIME AND DATE | CAPTURED IMAGE |
|---|---|---|
| #100 | ○ : △, ×, ×, 20×× | |
| #200 | △ : □, ×, ×, 20×× | |
| ⋮ | ⋮ | ⋮ |

| IMAGE IDENTIFIER | IMAGE CAPTURING TIME AND DATE | CAPTURED IMAGE | COMPRESSED IMAGE |
|---|---|---|---|
| #100 | ○ : △, ×, ×, 20×× | | |
| #200 | △ : □, ×, ×, 20×× | | |
| ⋮ | ⋮ | ⋮ | ⋮ |

IMAGE CAPTURING APPARATUS HAVING A SMALL REMOVABLE MEMORY AND A SMALL DISPLAY, IMAGE CAPTURING METHOD AND IMAGE STORING APPARATUS THEREOF

CROSS REFERENCE TO RELATED APPLICATION

The present application claims priority from a Japanese Patent Application No. JP 2005-143367 filed on May 17, 2005, the contents of which are incorporated herein by reference.

BACKGROUND OF THE INVENTION

1. Field of the Invention

The present invention relates to an image capturing apparatus, an image capturing method and an image storing apparatus. More specifically, the invention relates to an image capturing apparatus, an image capturing method and an image storing apparatus that allow captured images to be confirmed.

2. Related Art

There has been proposed an electronic camera having first display means functioning as a finder in capturing an image and second display means (external display monitor) functioning as a monitor in reproducing a captured image and arranged so as to be removable from a main body of the camera, wherein contents displayed on the first display means is differentiated from contents displayed on the external display monitor so as to enable its user to compare the two images displayed on the first display means and the external display monitor to select a better looking image or so as to enable the user to readily confirm an effect of correction made on the captured image as disclosed in Japanese Patent Application Publication No. 1999-266381 for example.

However, although the JP Publication No. 1999-266381 enables the user to confirm the images both on the first display means and the external display monitor provided in the electronic camera, the user may wish to confirm the captured images on a larger screen. Still more, if the captured images have been transferred from the electronic camera to a recording medium and the like other than the electronic camera, the user is unable to confirm the images already captured by the user on the electronic camera. Further, when the user appreciates the captured images by connecting the electronic camera with an external display unit such as a TV monitor, the user must control the very electronic camera connected with the external display unit to display the captured images on the external display unit. Accordingly, there has been a problem that the user is unable to deliberately appreciate the captured images displayed on the external display unit.

Accordingly, it is an object of the invention to provide an image capturing apparatus, an image capturing method and an image storing apparatus, which are capable of solving the above-mentioned problems. This object may be achieved through the combination of features described in independent claims of the invention. Dependent claims thereof specify preferable embodiments of the invention.

SUMMARY OF THE INVENTION

In order to solve the above-mentioned problems, according to a first aspect of the invention, there is provided an image capturing apparatus having an image capturing section for capturing images, a large memory for storing the images captured by the image capturing section, a small memory whose memory capacity is smaller than that of the large memory and which is removable from the image capturing section, an image compressing section for irreversibly compressing the captured images, a storage processing section for storing the compressed images irreversibly compressed by the image compressing section into the small memory, a small display section having a less number of pixels than that of the captured images and a display control section for reading the compressed images out of the small memory to display on the small display section. The small memory may require less power consumption in reading an image of a same capacity out thereof than that required in reading out of the large memory.

The small display section may be removable, together with the small memory, from the image capturing section. The image capturing apparatus may further include an image outputting section for reading the captured images out of the large memory to output to an external display section connected on the outside and a remote control section provided in a body with the small memory and the small display section, and the remote control section may transmit image specifying information specifying a captured image that corresponds to a compressed image selected on the remote control section to the image outputting section so as to output the captured image specified by the image specifying information on the external display section from the image outputting section.

The remote control section may display a compressed image that corresponds to a captured image to be displayed next on the external display section on the small display section in advance and when the user selects the compressed image, may transmit image specifying information specifying the captured image that corresponds to that compressed image to the image outputting section to display fie captured image specified by the image specifying information on the external display section. The image capturing apparatus may further include a battery for feeding operating power to the image capturing section, the large memory, the small memory; the image compressing section, the storage processing section, the small display section, the display control section, the image outputting section and the remote control section. Still more, the large memory may be a hard disk drive and the small memory may be a semiconductor memory.

The storage processing section may store the image captured by the image capturing section once in the small memory and then may transfer the plurality of captured images altogether to the large memory. The storage processing section may also transfer the plurality of captured images altogether to the large memory when an empty capacity of the small memory has fallen below a reference value set in advance. The storage processing section may transfer the captured images from the small memory to the large memory and may store only the compressed images in the small memory when power is fed from the outside.

According to a second aspect of the invention, there is provided an image capturing method for capturing images, having an image compressing step of compressing the captured images, a storage processing step of storing the compressed images irreversibly compressed in the image compressing step to a small memory that has a less memory capacity than a large memory for storing the captured images captured by an image capturing section and that is removable from the an image capturing section and a display control step of reading the compressed images out of the small memory to display on a small display section having a less number of pixels than that of the captured images.

The image capturing method may further include an image outputting step of reading the captured image out of the large memory to display on an external display section connected on the outside and a remote control step of transmitting image specifying information specifying the captured image that corresponds to the compressed image selected by the user on a remote control section provided in a body with the small memory and the small display section to display the captured image specified by the image specifying information on the external display section from the image outputting section. The image captured by the image capturing section may be stored once in the small memory and then a plurality of captured images may be transferred altogether to the large memory in the storage processing step. Still more, in the storage processing step, the plurality of captured images may be transferred altogether to the large memory when an empty capacity of the small memory has fallen below a reference value set in advance.

According to a third aspect of the invention, there, is provided an image storing apparatus for storing captured images, having a large memory for storing the captured images, a small memory whose memory capacity is smaller than that of the large memory and which is removable from the image capturing section, an image compressing section for compressing the captured images, a storage processing section for storing the compressed images compressed by the image compressing section to the small memory, a small display section having a less number of pixels than a number of pixels of the captured image and a display control section for reading the compressed images out of the small memory to display on the small display section.

The image storing apparatus may further include an image outputting section for reading a captured image out of the large memory to output to an external display section connected on the outside and a remote control section provided in a body with the small memory and the small display section, and the remote control section may transmit image specifying information specifying a captured image that corresponds to a compressed image selected on the remote control section to the image outputting section to output the captured image specified by the image specifying information on the external display section from the image outputting section. The remote control section may display a compressed image that corresponds to a captured image to be displayed next on the external display section on the small display section in advance and when the user selects that compressed image, may transmit image specifying information specifying the captured image that corresponds to that compressed image to the image outputting section to output the captured image specified by the image specifying information on the external display section from the image outputting section. Then, the large memory may be a hard disk drive and the small memory may be a semiconductor memory.

It is noted that the summary of the invention described above does not necessarily describe all necessary features of the invention. The invention may also be a sub-combination of the features described above.

According to the invention, the image capturing apparatus enables the user to confirm the images already captured by the user on the image capturing apparatus even when the captured images have been transferred from the image capturing apparatus to another storage device other than the image capturing apparatus. Still more, the invention enables the user to display the captured image, which the user desires to appreciate, by remotely controlling the image capturing apparatus connected with the external display unit.

BRIEF DESCRIPTION OF THE DRAWINGS

FIG. 4 is a table showing contents in a large memory.

FIG. 5 is a table showing contents in a small memory.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
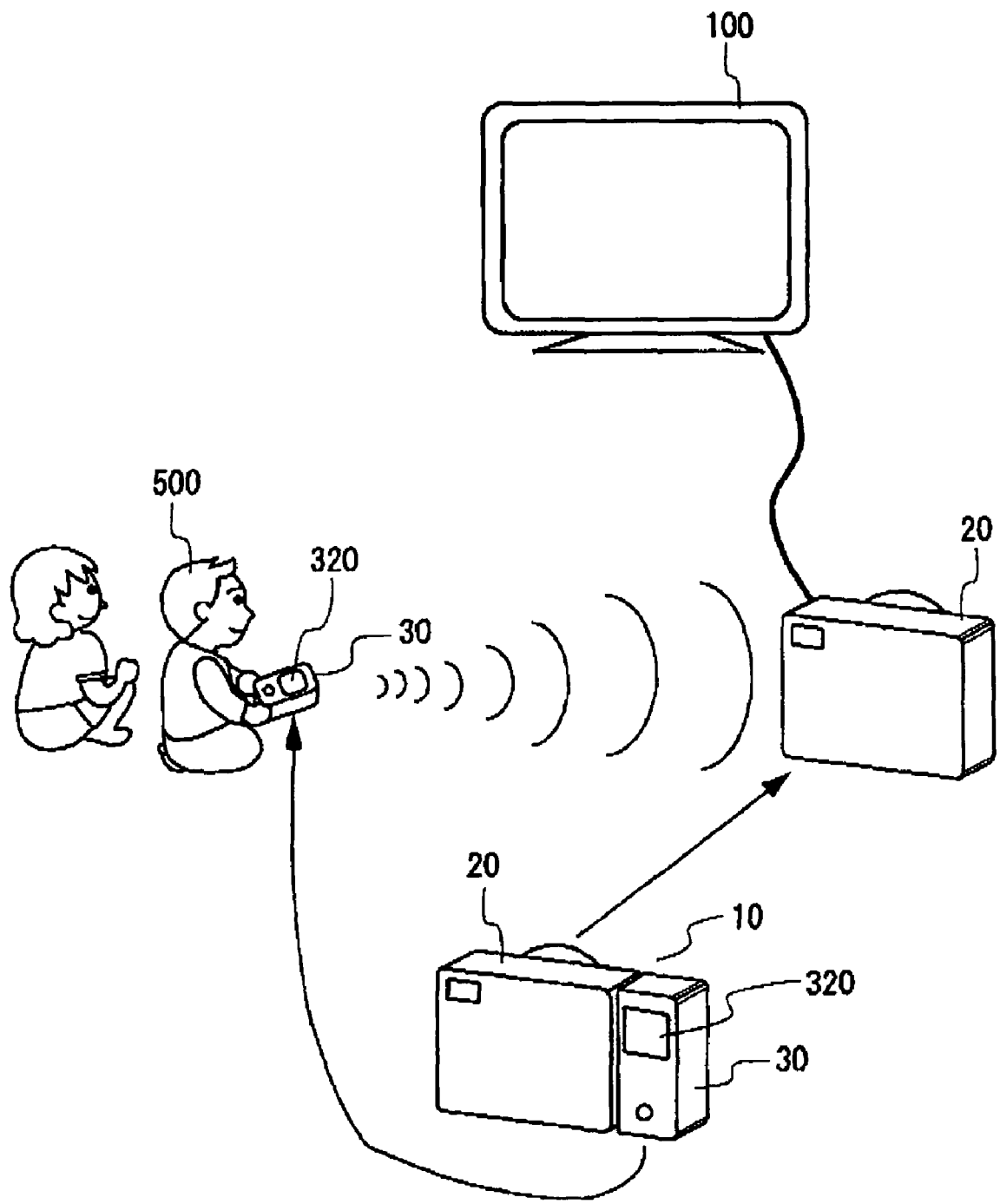
FIG. 1 is a conceptual drawing of an image capturing apparatus.

FIG. 1 shows an outline of an image capturing apparatus 10 according to one embodiment of the invention. An object of the image capturing apparatus 10 of the embodiment is to enable a user 500 to confirm images which have been already captured by the image capturing apparatus 10 even when the captured images have been transferred from the image capturing apparatus 10 to another storage device other than the image capturing apparatus 10 and to enable the user to appreciate the captured images which the user desires to appreciate by displaying them on an external display section 100 by remotely controlling the image capturing apparatus 10 connected with the external display section 100.

The image capturing apparatus 10 has an image capturing unit 20 and a remote control unit 30. The image capturing unit 20 may be a digital camera for example. The remote control unit 30 may be a portable viewer for example. The user 500 may capture a large number of images by the image capturing apparatus 10. Then, the image capturing apparatus 10 stores the images captured by the user 500 to the image capturing unit 20. In succession, the image capturing unit 20 compresses the captured images to generate compressed images. The compressed images compressed by the image capturing unit 20 are stored in the remote control unit 30.

The user 500 can confirm the compressed images stored in the remote control unit 30 by displaying on a small display section 320 of the remote control unit 30. Then, the user 500 can capture more images while confirming the compressed images displayed on the small display section 320 of the remote control unit 30. When the user 500 desires to appreciate the captured images by largely displaying on the external display section 100 such as a TV monitor, the user 500 may divide the image capturing apparatus 10 into the image capturing unit 20 and the remote control unit 30. Then, the user 500 can connect the image capturing unit 20 with the external display section 100. Meanwhile, the user 500 holds the remote control unit 30 of the image capturing apparatus 10.

Then, the user 500 selects the compressed image which the user 500 desires to appreciate, among the compressed images displayed on the small display section 320 of the remote control unit 30 while watching the compressed images displayed on the remote control unit 30. When the user 500 selects a certain compressed image, the remote control unit 30 transmits image specifying information corresponding to that compressed image to the image capturing unit 20. The image capturing unit 20 outputs the captured image correlated with the received image specifying information to the external display section 100. Then, the external display section 100 displays the captured image which the user 500 desired to appreciate.

The image capturing apparatus 10 of the present embodiment allows the compressed image of the captured image to be stored in the remote control unit 30 provided in the image capturing apparatus 10. Then, the remote control unit 30 may be detached from the image capturing apparatus 10 and may enable the user to select the captured image to be outputted from the image capturing unit 20 to the external display section 100. Thereby, the user 500 can display the captured image, which the user 500 desired to appreciate, on the external display section 100 without touching the image capturing unit 20 connected with the external display section 100.

Figure 2:
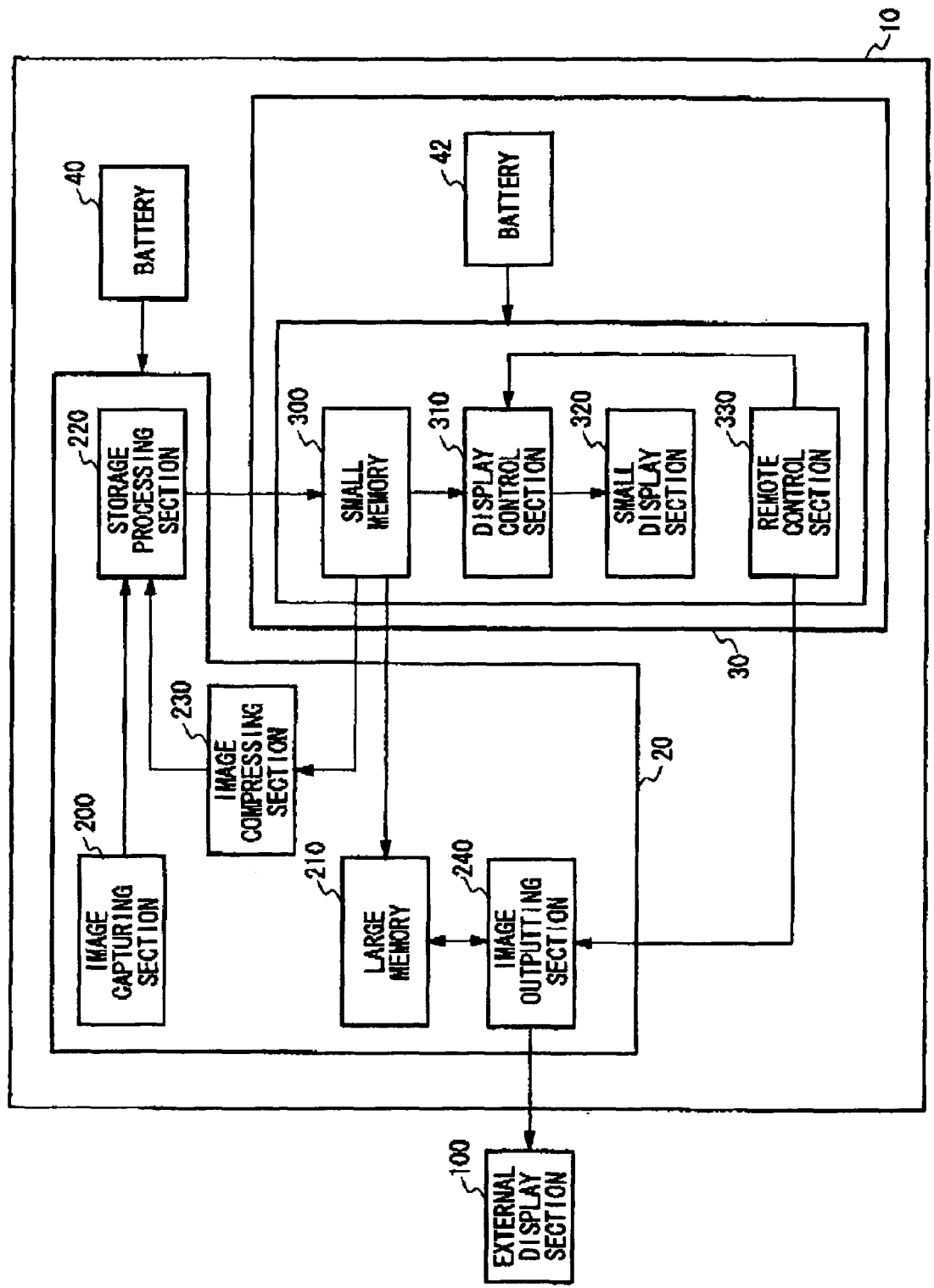
FIG. 2 is a block diagram showing a functional configuration of the image capturing apparatus.

FIG. 2 is a block diagram showing a functional configuration of the image capturing apparatus 10 of the present embodiment. The image capturing apparatus 10 has the image capturing unit 20, the remote control unit 30 and a battery 40. The image capturing unit 20 has an image capturing section 200, a large memory 210, an image compressing section 230, a storage processing section 220 and an image outputting section 240. It is noted that the image capturing unit 20 may be a digital camera for example. Meanwhile, the remote control unit 30 has a small memory 300, a display control section 310, a small display section 320, a remote control section 330 and a battery 42. It is noted that the remote control unit 30 may be a portable viewer for example.

The storage processing section 220 supplies an image captured by the image capturing unit 200 once to the small memory 300. The small memory 300 stores the captured image received from the image capturing unit 200 via the storage processing section 220 by correlating with an image identifier that allows the captured image to be uniquely identified. Here, the small memory 300 may be a storage device whose memory capacity and power consumption are smaller than those of the large memory 210 and may be a semiconductor memory such as a flash memory for example.

The small memory 300 supplies the captured image to the image compressing section 230. The image compressing section 230 irreversibly compresses the captured image received from the small memory 300. The image compressing section 230 may use such image compressing method as JPEG in irreversibly compressing a still image. The image compressing section 230 may also use such image compressing method as MPEG in irreversibly compressing a video image. The storage processing section 220 receives the compressed image compressed by the image compressing section 230 from the image compressing section 230 and supplies it to the small memory 300. The small memory 300 stores the compressed image received from the image compressing section 230 via the storage processing section 220 by correlating with an image identifier that allows the compressed image and the captured image of the compressed image before it has been compressed to be uniquely identified. The small memory 300 supplies the compressed image to the display control section 310.

The image compressing section 230 may reduce size or resolution of the image as means for irreversibly compressing the images. The captured image stored in the large memory 210 may be also compressed. In such a case, the image compressing section 230 may compress the captured image at higher compression rate as means for irreversibly compressing the images. More preferably, the image compressing section 230 may increase the image compression rate by reducing a number of components of frequency component to be stored or by reducing a number of bits representing level of the frequency component in storing the images by frequency-converting per region for example.

The storage processing section 220 may also transfer a plurality of images captured by the image capturing section 200 and stored once in the small memory 300 altogether to the large memory 210. Still more, the storage processing section 220 may transfer the captured images stored in the memory 300 automatically to the large memory 210. It is noted that the storage processing section 220 may store the image captured by the image capturing section 200 once in the small memory 300 and then may transfer it to the large memory 210 during when no image is captured. Then, the storage processing section 220 may store the image captured by the image capturing section 200 once in the small memory 300 and may then transfer the captured images altogether to the large memory 210 during when no image is captured.

Here, the large memory 210 may be a storage device for storing the captured images captured by the image capturing unit 200 and may be a hard disk drive using a magnetic recording medium for example.

It is noted that the time when the storage processing section 220 transfers the plurality of captured images altogether from the small memory 300 to the large memory 210 may be when a number of images set in advance is stored in the small memory 300. Still more, the storage processing section 220 may transfer the plurality of captured images altogether to the large memory 210 when an empty capacity of the memory capacity of the small memory 300 has fallen below a reference value-set in advance.

It allows the power consumption of the image capturing apparatus 10 to be significantly saved because a number of times of starting, driving and stopping the large memory 210 is reduced as compared to a case of operating the large memory 210 to store a captured image every time when the image is captured by the image capturing section 200.

Still more, the storage processing section 220 may transfer the captured images from the small memory 300 to the large memory 210 to keep compressed images in the small memory 300 when power is fed from the outside of the image capturing apparatus 10. When no power is fed from the outside of the image capturing apparatus 10, the storage processing section 220 may hold the process for transferring the captured images to the large memory 210 without transferring the captured images from the small memory 300 to the large memory 210 until when power is fed to the image capturing apparatus 10. It is noted that the captured images stored in the small memory 300 may be erased when they have been transferred from the small memory 300 to the large memory 210. It prevents the storage capacity of the small memory 300 from becoming tight by the captured images whose information amount is larger than that of the compressed images.

It also allows the usable span of the batteries 40 and 42 of the image capturing apparatus 10 to be prolonged because their power consumed for transferring the captured images is reduced. Accordingly, the user 500 can capture more images by the image capturing apparatus 10.

The display control section 310 supplies the compressed image received from the small memory 300 to the small display section 320. Then, the small display section 320 displays the compressed image received from the small memory 300 via the display control section 310. Here, the small display section 320 may be a display unit such as a liquid crystal display having a less number of pixels than that of the captured images.

Here, power consumed for displaying a compressed image on the small display section 320 is small as compared to a case of displaying a captured image on the small display section 320 because a data amount of the compressed image is small as compared to that of the captured image. Accordingly, it is possible to suppress the power consumption by displaying the compressed image on the small display section 320 as compared to the case of displaying the uncompressed captured image thereon. Still more, when the small memory 300 is a semiconductor memory, the power consumption of the image capturing apparatus 10 maybe lessened further because the semiconductor memory consumes less power in reading/writing an image out of/on the memory as compared to a hard disk drive.

The remote control section 330 is provided in a body with the small memory 300 and the small display section 320. It is noted that the small memory 300 may be removable, together with the small display section 320, from the image capturing apparatus 10. That is, the remote control unit 30 may be removable from the image capturing apparatus 10. Thereby, when the user 500 connects the image capturing unit 20 with the external display section 100, the user 500 can holds the remote control unit 30 while detaching the remote control unit 30 from the image capturing unit 20 of the image capturing apparatus 10.

The remote control section 330 transmits image specifying information specifying a captured image that corresponds to a compressed image selected by the user 500 on the remote control section 330 to the image outputting section 240. In concrete, the user 500 selects the compressed image that corresponds to the captured image which the user 500 desires to display on the external display section 100 among the compressed images displayed on the small display section 320 of the remote control unit 30. When the user 500 selects the compressed image displayed on the small display section 320, the remote control section 330 transmits the image specifying information correlated with the compressed image that has been selected by the user 500 to the image outputting section 240. It is noted that the image identifier is one example of the image specifying information. The remote control section 330 also displays a compressed image that corresponds to a captured image to be displayed next on the external display section 100 on the small display section 320 in advance. Then, when the user 500 selects the compressed image that corresponds to that captured image, the remote control section 330 may transmit the image specify information specifying the captured image that corresponds to that compressed image to the image outputting section 240.

Then, the image outputting section 240 reads the captured image stored in the large memory 210 in correlation with the image specifying information received from the remote control section 330 out of the large memory 210. Then, the image outputting section 240 supplies the captured image read out of the large memory 210 to the external display section 100 connected with the image capturing unit 20. The external display section 100 displays the captured image received from the image outputting section 240. It is noted that the external display section 100 may be a monitor of a personal computer or a TV monitor such as a HDTV.

It is noted that the battery 40 feeds operating power to each section of the image capturing section 200, the large memory 210, the storage processing section 220, the image compressing section 230 and the image outputting section 240, included in the image capturing unit 20. Still more, the battery 42 feeds operating power to the small memory 300, the display control section 310, the small display section 320 and the remote control section 330, included in the remote control unit 30.

Thus, the image capturing apparatus 10 of the present embodiment allows the compressed image of the captured image to be stored in the remote control unit 30 of the image capturing apparatus 10 and allows the user 500 to confirm the compressed image stored in the remote control unit 30 on the small display section 320 of the remote control unit 30. Thereby, even if the image capturing unit 20 is connected with the external display section 100, the user 500 can freely display the desirable captured image on the external display section 100 just by selecting the compressed image which the user 500 desires to appreciate on the remote control unit 30 at position distant from the image capturing unit 20.

Figure 3:
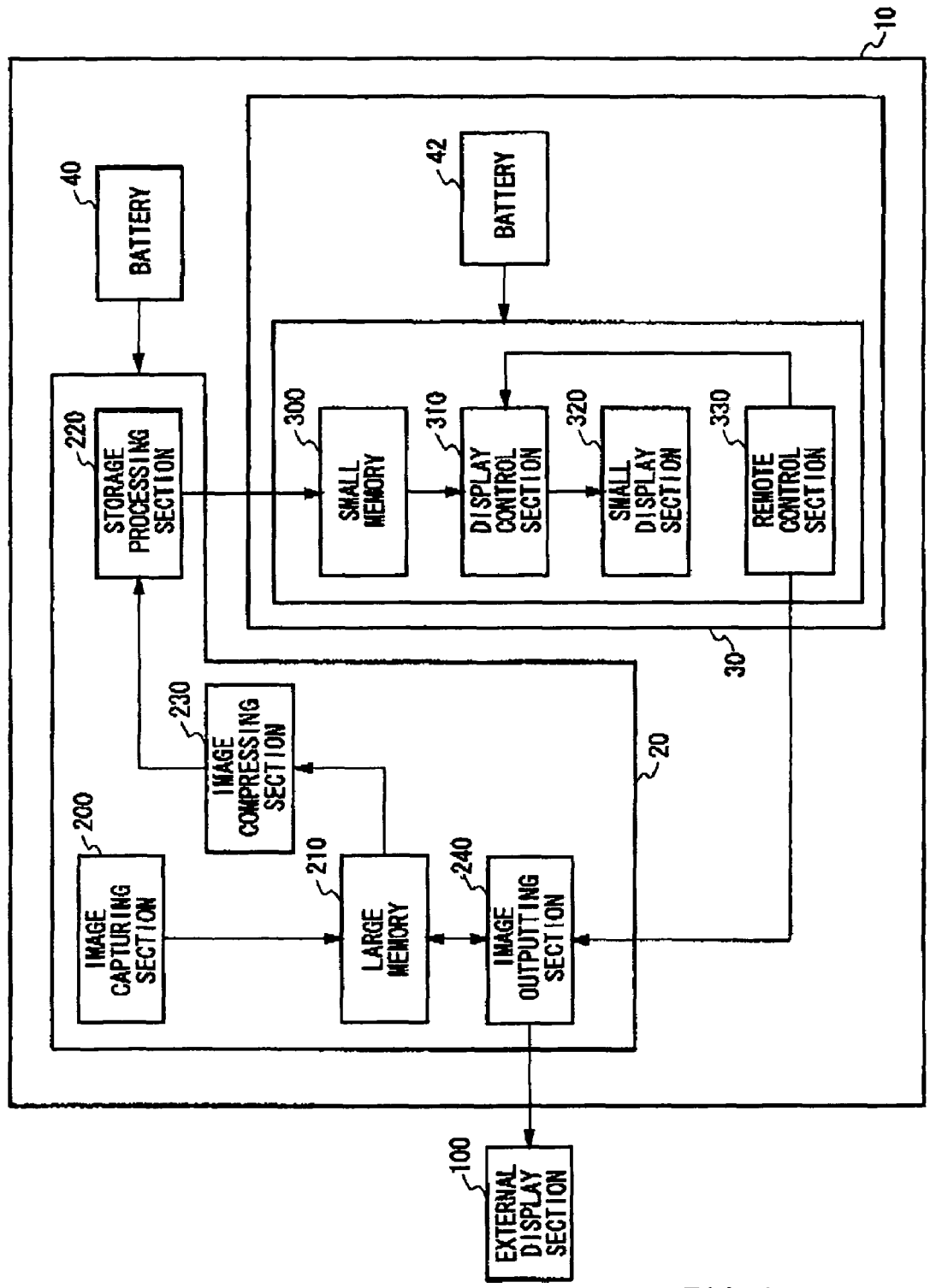
FIG. 3 is a block diagram showing a functional configuration of another image capturing apparatus.

FIG. 3 is a block diagram showing a functional configuration of another image capturing apparatus 10 of the embodiment. Here, the image capturing unit 20, the remote control unit 30 and the battery 40 as well as the image capturing section 200, the large memory 210, the storage processing section 220, the image compressing section 230, the image outputting section 240, the small memory 300, the display control section 310, the small display section 320, the remote control section 330 and the battery 42 have the same functions with those denoted by the same reference numerals and explained in the above description in connection with FIG. 2, respectively, so that their detailed explanation will be omitted here.

The large memory 210 may store an image captured by the image capturing unit 200 at first by correlating with an image identifier that allows the captured image to be uniquely identified. Then, the large memory 210 supplies the captured image to the image compressing section 230. Next, the image compressed by the image compressing section 230 is sent to the small memory 300 via the storage processing section 220. The small memory 300 stores the compressed image by correlating with the image identifier that allows the compressed image to be uniquely identified.

Then, the compressed image stored in the small memory 300 is sent to the small display section 320 via the display control section 310. The small display section 320 displays the received compressed image. The remote control section 330 transmits image specifying information specifying a captured image that corresponds to the compressed image selected by the user 500 on the remote control section 330 to the image outputting section 240. The remote control section 330 may also display a captured image, to be displayed next on the external display section 100, on the small display section 320 in advance and when the user 500 selects the compressed image that corresponds to that captured image, may transmits image specifying information specifying the captured image to the image outputting section 240.

The image outputting section 240 reads out the captured image stored in the large memory 210 in correlation with the image specifying information received from the remote control section 330. Then, the image outputting section 240 supplies the captured image read out of the large memory 210 to the external display section 100 connected with the image capturing unit 20. The external display section 100 displays the captured image received from the image outputting section 240.

FIG. 4 is a table showing one exemplary contents of the large memory 210 of the embodiment. The large memory 210 stores images captured by the image capturing section 200 by correlating with image identifiers that allow the captured images to be uniquely identified. The large memory 210 may store file names correlated with the captured images by correlating with the image identifiers that allow the captured images to be uniquely identified.

The large memory 210 may be a storage device such as a hard disk composed of a magnetic recording medium for example. Still more, the large memory 210 may store image capturing conditions such as image capturing time and date when the captured image was captured, image capturing place, focal distance and others by correlating with the image identifier that allows the captured image to be uniquely identified. When the captured image has been transferred from the large memory 210 to the external display section 100, the captured image stored in the large memory 210 may be erased. It allows images captured by the user 500 to be stored further in the large memory 210 because it allows the empty capacity of the memory capacity of the large memory 210 to be maintained.

FIG. 5 is a table showing one exemplary contents of the small memory 300 of the embodiment. The small memory 300 stores the compressed images compressed by the image compressing section 230 by correlating with image identifiers that allow the compressed images to be uniquely identified. The small memory 300 may store file names correlated with the compressed images by correlating with the image identifiers that allow the compressed images to be uniquely identified.

The small memory 300 may be a storage device whose memory capacity and power consumption are smaller than those of the large memory 210 and may be a semiconductor memory such as a flash memory. The small memory 300 also stores images captured by the image capturing section 200 by correlating with the image identifiers that allow the captured images to be uniquely identified. Still more, the small memory 300 may store image capturing conditions such as image capturing time and date, image capturing place, a focal distance and the like by correlating with image identifiers that allow the captured images to be uniquely identified. When the storage processing section 220 has transferred the captured images from the small memory 300 to the large memory 210, the captured images stored in the small memory 300 may be erased. It allows the empty capacity of the memory capacity of the small memory 300 to be maintained.

Figure 6:
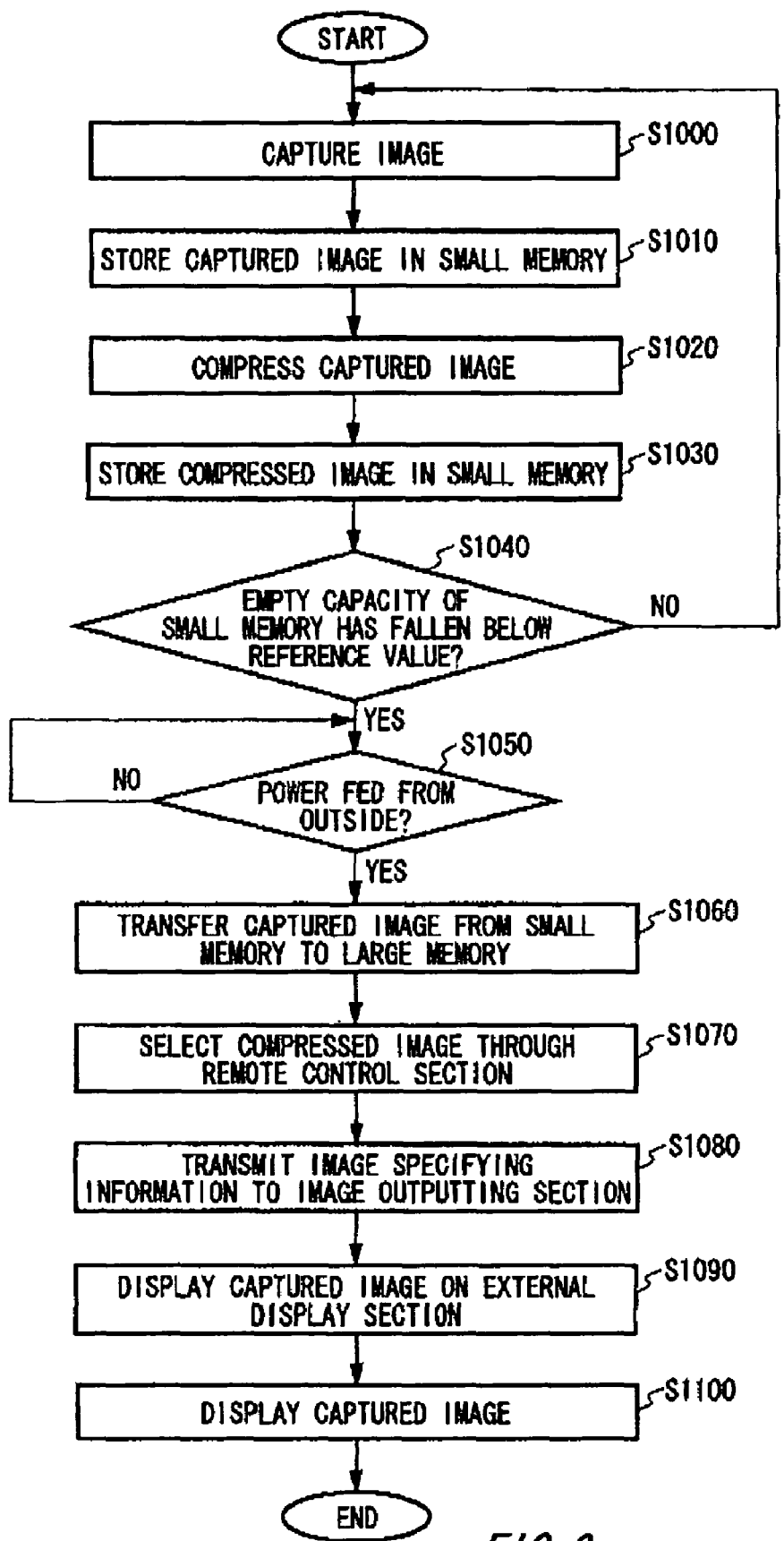
FIG. 6 is a flowchart showing a flow of processes of the image capturing apparatus.

FIG. 6 is a flowchart showing a flow of processes of the image capturing apparatus 10 of the embodiment. At first, the user 500 captures an image by the image capturing section 200 in Step S1000. Then, the storage processing section 220 stores the captured image in the small memory 300 by correlating with an image identifier that allows the captured image to be uniquely identified in Step S1010. The small memory 300 supplies the captured image stored therein to the image compressing section 230. Then, the image compressing section 230 compresses the captured image received from the small memory 300 in Step S1020. When the image compressing section 230 receives a still image for example, it may compress the captured image by using such image compressing method as JPEG. When the image compressing section 230 receives a video image, it may compress the captured image by using such image compressing method as MPEG. It is noted that a data amount of the compressed image is very small as compared to the captured image. Accordingly, even if the compressed image is left in the small memory 300, the storage capacity of the small memory 300 in which captured images are stored is scarcely reduced.

The small memory 300 stores the compressed image compressed by the image compressing section 230 and received from the storage processing section 220 by correlating with the image identifier that allows the compressed image to be uniquely identified in Step S1030. Then, the small memory 300 supplies the compressed image to the display control section 310. In succession, the display control section 310 supplies the compressed image received from the small memory 300 to the small display section 320 that is a display having a less number of pixels than that of the captured image. Then, the small display section 320 displays the received compressed image. Here, the data amount of the compressed image is small as compared to that of the captured image. It prolongs a usable life of the battery 40 of the image capturing apparatus 10 because power consumption in reading a compressed image out of the small memory 300 is small as compared to a case of reading a captured image. It is noted that because the power consumption of the image capturing apparatus 10 decreases in accordance to an image compression rate in compressing a captured image into a compressed image, it is possible to adjust the usable life of the battery 40 of the image capturing apparatus 10 based on the image compression rate. It is then possible to prolong the usable period of the battery 40 by increasing the image compression rate.

Next, the storage processing section 220 judges whether or not the empty capacity of the small memory 300 has fallen below a reference value set in advance in Step S1040. When the empty capacity of the small memory 300 has not fallen below the reference value set in advance, i.e., No in Step S1040, the captured images and compressed images are stored continuously into the small memory 300. When the empty capacity of the small memory 300 has fallen below the reference value set in advance on the other hand, i.e., Yes in Step S1040, the storage processing section 220 confirms whether or not power is being fed to the image capturing apparatus 10 from the outside in Step S1050. When no power is being fed to the image capturing apparatus 10 from the outside, i.e., No in Step S1050, the storage processing section 220 stops the process to be continued and stands by until when power is fed to the image capturing apparatus 10 from the outside.

When power is being fed to the image capturing apparatus 10 from the outside on the other hand, i.e., Yes in Step S1050, the storage processing section 220 transfers the captured images from the small memory 300 to the large memory 210 and stores the compressed images in the small memory 300 in Step S1060. Then, the large memory 210 stores the captured images received from the small memory 300 by correlating with the image identifiers.

In succession, the user 500 connects the image capturing unit 20 with the external display section 100. Then, the user 500 holds the remote control unit 30. When the user 500 selects a compressed image displayed on the small display section 320 of the remote control unit 30 through the remote control section 330 in Step S1070, the remote control section 330 transmits image specifying information corresponding to the compressed image selected by the user 500 in Step S1080.

The image outputting section 240 reads out the captured image stored in the large memory 210 in correlation with the image specifying information received from the remote control section 330. Then, the image outputting section 240 outputs the read captured image to the external display section 100 in Step S1090. The external display section 100 displays the captured image received from the image outputting section 240 in Step S1100.

Figure 7:
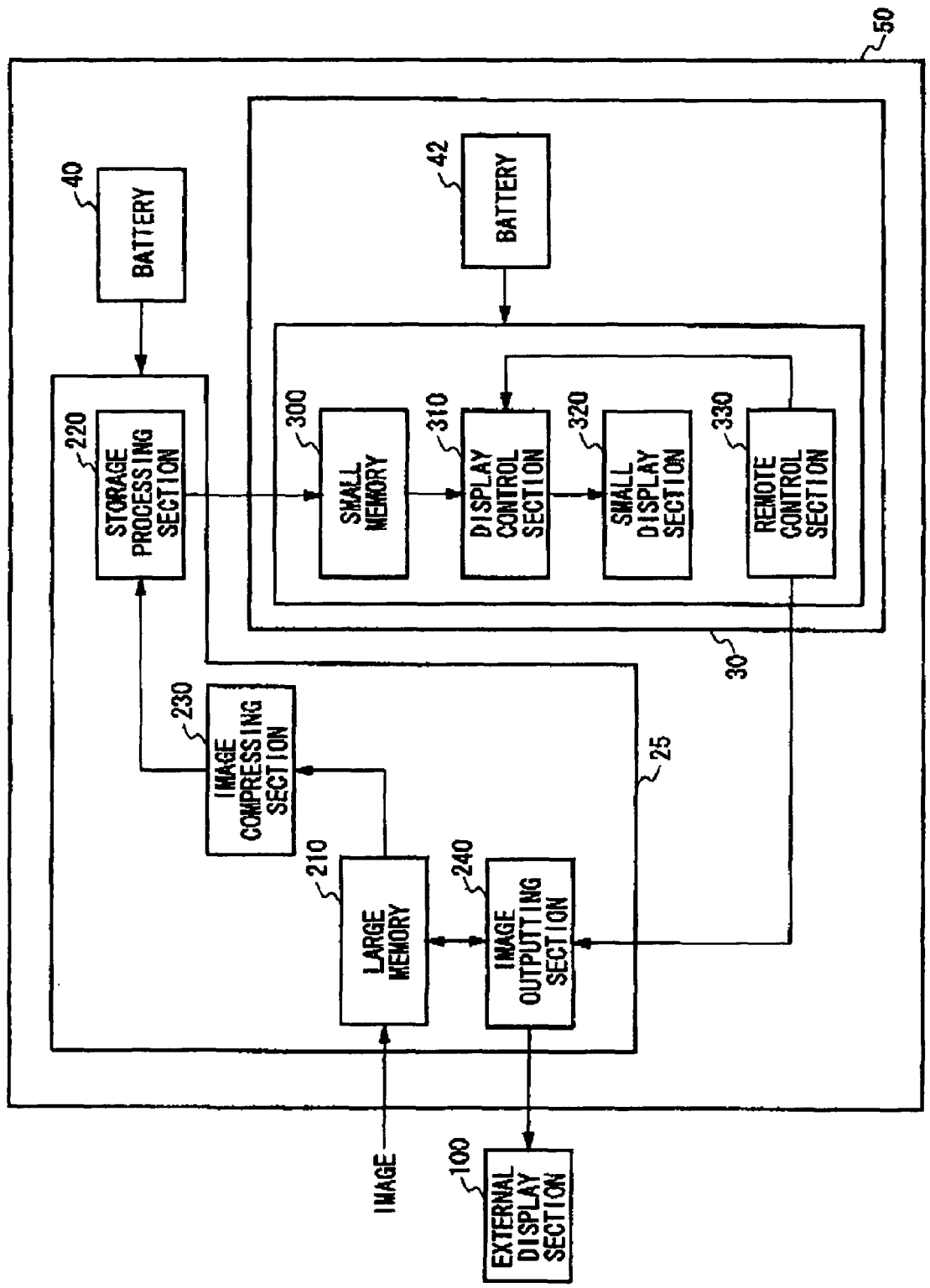
FIG. 7 is a block diagram showing a functional configuration of an image storing apparatus.

FIG. 7 is a block diagram showing a functional configuration of an image storing apparatus 50 of the embodiment The image storing apparatus 50 has an image storing unit 25, a remote control unit 30 and a battery 40. The image storing unit 25 has a large memory 210, a storage processing section 220, an image compressing section 230 and an image outputting section 240. It is noted that the image storing unit 25 may be a portable viewer for example. Here, the remote control unit 30 and the battery 40 as well as the large memory 210, the storage processing section 220, the image compressing section 230, the image outputting section 240, the small memory 300, the display control section 310, the small display section 320, the remote control section 330 and the battery 42 have the same functions with those denoted by the same reference numerals and explained in the above description in connection with FIG. 2, respectively, so that their detailed explanation will be omitted here.

The image storing apparatus 50 receives a large number of captured images from the image capturing apparatus 10, memories and a network such as Internet. The captured images are sent to the large memory 210 and the large memory 210 stores the received captured images by correlating with image identifiers that allow the captured images to be uniquely identified. Then, the large memory 210 supplies the captured images to the image compressing section 230. In succession, the storage processing section 220 supplies the compressed images compressed by the image compressing section 230 to the small memory 300. The small, memory 300 stores the compressed images by correlating with image identifiers that allow the compressed images to be uniquely identified. It is noted that the image storing unit 25 may have a display unit having a large number of pixels as compared to that of the small display section 320 of the remote control unit 30. When the image storing unit 25 is provided with such display unit, the user 500 can confirm the captured images on the image storing unit 25 of the image storing apparatus 50.

Then, the display control section 310 supplies the compressed images stored in the small memory 300 to the small display section 320 to display the compressed images thereon. The remote control section 330 transmits the image specifying information specifying the captured image that corresponds to the compressed image selected by the user 500 on the remote control section 330 to the image outputting section 240. Still more, the remote control section 330 may display a captured image to be displayed next on the external display section 100 on the small display section 320 in advance and when the user 500 selects the compressed image that corresponds to that captured image, may transmit the image specifying information specifying the captured image that corresponds to that compressed image to the image outputting section 240.

The image outputting section 240 reads out the captured image stored in the large memory 210 in correlation with the image specifying information received from the remote control section 330. Then, the image outputting section 240 supplies the captured image read out of the large memory 210 to the external display section 100 connected with the image capturing unit 20. The external display section 100 displays the captured image received from the image outputting section 240.

Thus, the image storing apparatus 50 of the present embodiment allows the compressed image of the captured image received from the image capturing apparatus 10 and the like to be stored in the remote control unit 30 of the image storing apparatus 50 and allows the user 500 to confirm the compressed image stored in the remote control unit 30 on the small display section 320 of the remote control unit 30. Thereby, even if the image storing unit 25 is connected with the external display section 100, the user 500 can freely display the desirable captured image on the external display section 100 just by selecting the compressed image which the user 500 desires to appreciate on the remote control unit 30 at position distant from the image storing unit 25.

Figure 8:
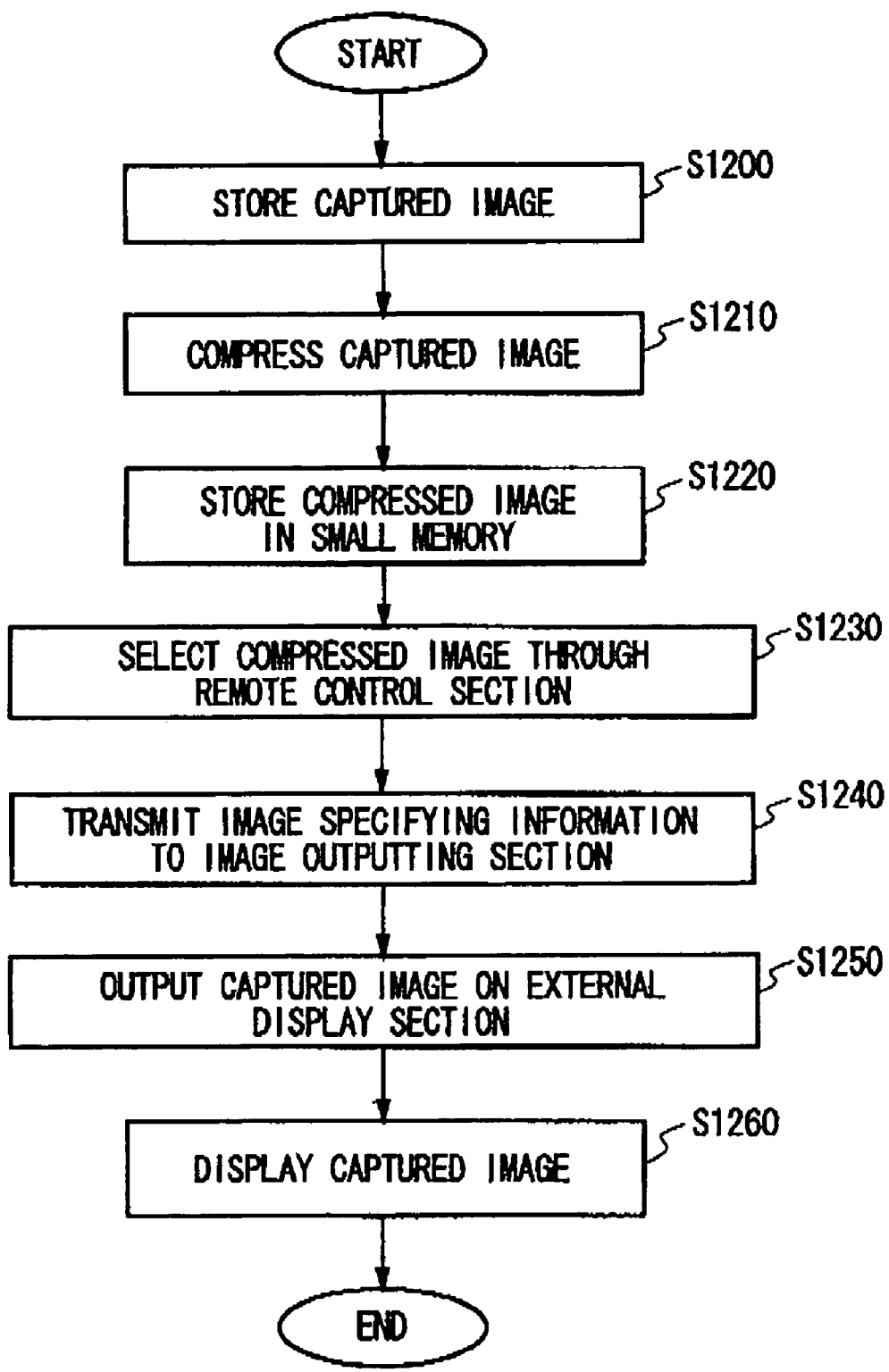
FIG. 8 is a flowchart showing a flow of processes of the image storing apparatus.

FIG. 8 is a flowchart showing a flow of processes of the image storing apparatus 50. At first, a captured image is sent to the large memory 210 and the large memory 210 stores the received captured image by correlating with an image identifier that allows the captured image to be uniquely identified in Step S1200. The large memory 210 supplies the captured image to the image compressing section 230. The image compressing section 230 compresses the received captured image in Step S1210. When the image compressing section 230 receives a still image from the large memory 210 for example, the image compressing section 230 may compress the captured image by using such image compressing method as JPEG. When the image compressing section 230 receives a vide image from the large memory 210, the image compressing section 230 may also compress the captured image by using such image compressing method as MPEG.

The storage processing section 220 stores the compressed image compressed by the image compressing section 230 into the small memory 300 by correlating with an image identifier in Step S1220. Then, the small memory 300 supplies the compressed image to the display control section 310. Next, the display-control section 310 supplies the compressed image received from the small memory 300 to the small display section 320 that is a display having a less number of pixels than that of the captured image. Then, the small display section 320 displays the received compressed image. Here, a data amount of the compressed image is small as compared to that of the captured image. It requires less power consumption in reading the compressed image out of the small memory 300 as compared to a case of reading the captured image, so that it prolongs a usable life of the battery 40 of the image storing apparatus 50. It is noted that because the power consumption of the image capturing apparatus 10 decreases in accordance to an image compression rate in compressing the captured image into the compressed image, so that the usable span of the battery 40 of the image storing apparatus 50 may be adjusted based on the image compression rate.

Next, the user 500 connects the image storing unit 25 with the external display section 100. Then, the user 500 holds the remote control unit 30. When the user 500 selects the compressed image displayed on the small display section 320 of the remote control unit 30 in the remote control section 330 in Step S1230, the remote control section 330 then transmits image specifying information corresponding to the compressed image selected by the user 500 to the image outputting section 240 in Step S1240.

The image outputting section 240 reads out the captured image stored in the large memory 210 in correlation with the image specifying information received from the remote control section 330. Then, the image outputting section 240 outputs the read captured image to the external display section 100 in Step S1250. The external display section 100 displays the captured image received from the image outputting section 240 in Step S1260.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. An image capturing apparatus, comprising:
   an image capturing section for capturing images;
   a large memory for storing the images captured by said image capturing section;
   a small memory whose memory capacity is smaller than that of said large memory and is removable from said image capturing section;
   an image compressing section for irreversibly compressing said captured images;
   a storage processing section for storing said compressed images irreversibly compressed by said image compressing section into said small memory;
   a small display section having a less number of pixels than that of said captured images;
   a display control section for reading said compressed images out of said small memory to display on said small display section;
   an image outputting section for reading the captured images out of said large memory to output to an external display section connected on the outside; and
   a remote control section provided in a body with said small memory and said small display section,
   wherein said remote control section transmits image specifying information specifying a captured image that corresponds to a compressed image selected on said remote control section to said image outputting section so as to output said captured image specified by said image specifying information on said external display section from said image outputting section.

2. The image capturing apparatus as set forth in claim 1, wherein said small memory requires less power consumption in reading an image of the same capacity out thereof than that required in reading out of said large memory.

3. The image capturing apparatus as set forth in claim 1, wherein said small display section is removable, together with said small memory, from said image capturing section.

4. The image capturing apparatus as set forth in claim 1, wherein said remote control section displays a compressed image that corresponds to a captured image to be displayed next on said external display section on said small display section in advance and when the user selects said compressed image, transmits image specifying information specifying said captured image that corresponds to that compressed image to said image outputting section to display said captured image specified by said image specifying information on said external display section.

5. The image capturing apparatus as set forth in claim 1, further comprising a battery for feeding operating power to said image capturing section, said large memory, said small memory, said image compressing section, said storage processing section, said small display section, said display control section, said image outputting section and a remote control section.

6. The image capturing apparatus as set forth in claim 5, wherein said large memory is a hard disk drive and said small memory is a semiconductor memory.

7. The image capturing apparatus as set forth in claim 1, wherein said storage processing section stores the image captured by said image capturing section once in said small memory and then transfers a plurality of captured images altogether to said large memory.

8. The image capturing apparatus as wet forth in claim 7, wherein said storage processing section transfers a plurality of captured images altogether to said large memory when an empty capacity of said small memory has fallen below a reference value set in advance.

9. The image capturing apparatus as set forth in claim 7, wherein, said storage processing section transfers said captured images from said small memory to said large memory and stores only said compressed images in said small memory when power is fed from the outside.

10. An image capturing method for capturing images, comprising:
    an image compressing step of irreversibly compressing the captured images;
    a storage processing step of storing the compressed images irreversibly compressed in said image compressing step to a small memory that has less memory capacity than a large memory for storing the captured images captured by an image capturing section and that is removable from said image capturing section;
    a display control step of reading said compressed images out of said small memory to display on a small display section having a less number of pixels than that of said captured images;
    an image outputting step of reading the captured image out of said large memory to display on an external display section connected on the outside; and
    a remote control step of transmitting image specifying information specifying the captured image that corresponds to the compressed image selected by the user on a remote control section provided in a body with said small memory and said small display section to display the captured image specified by said image specifying information on said external display section from said image outputting section.

11. The image capturing method as set forth in claim 10, wherein images captured by the image capturing section are stored once in said small memory and then the plurality of captured images are transferred altogether to the large memory in said storage processing step.

12. The image capturing method as set forth in claim 10, wherein the plurality of captured images is transferred altogether to said large memory when the empty capacity of said small memory has fallen below a reference value set in advance.

13. An image storing apparatus, comprising:
    a large memory for storing captured images;
    a removable small memory whose memory capacity is smaller than that of said large memory;
    an image compressing section for irreversibly compressing said captured images;
    a storage processing section for storing the compressed images irreversibly compressed by said image compressing section to said small memory;
    a small display section having a less number of pixels than a number of pixels of said captured image;
    a display control section for reading said compressed images out of said small memory to display on said small display section;
    an image outputting section for reading a captured image out of said large memory to output to an external display section connected on the outside; and
    a remote control section provided in a body with said small memory and said small display section,
    wherein said remote control section transmits image specifying information specifying a captured image that corresponds to a compressed image selected on said remote control section to said image outputting section to output said captured image specified by said image specifying information on said external display section from said image outputting section.

14. The image storing apparatus as set forth in claim 13, wherein said remote control section displays a compressed image that corresponds to a captured image to be displayed next on said external display section on said small display section in advance and when the user selects that compressed image, transmits image specifying information specifying said captured image that corresponds to that compressed image to said image outputting section to output said captured image specified by said image specifying information on said external display section from said image outputting section.

15. The image storing apparatus as set forth in claim 14, wherein said large memory is a hard disk drive; and said small memory is a semiconductor memory.

* * * * *